(12) United States Patent
Scherer

(10) Patent No.: US 10,479,446 B2
(45) Date of Patent: Nov. 19, 2019

(54) PROPULSION DEVICE FOR A BICYCLE

(71) Applicant: Newer Commuter, LLC, Burbank, CA (US)

(72) Inventor: Andrew C. Scherer, Burbank, CA (US)

(73) Assignee: Newer Commuter, LLC, Burbank, CA (US)

(*) Notice: Subject to any disclaimer, the term of this patent is extended or adjusted under 35 U.S.C. 154(b) by 88 days.

(21) Appl. No.: 15/685,804

(22) Filed: Aug. 24, 2017

(65) Prior Publication Data

US 2018/0057108 A1 Mar. 1, 2018

Related U.S. Application Data

(60) Provisional application No. 62/379,316, filed on Aug. 25, 2016.

(51) Int. Cl.
*B62M 6/75* (2010.01)
*B62M 7/10* (2006.01)
(Continued)

(52) U.S. Cl.
CPC ............... *B62M 6/75* (2013.01); *B62M 6/35* (2013.01); *B62M 6/40* (2013.01); *B62M 7/10* (2013.01);
(Continued)

(58) Field of Classification Search
CPC .......... B62M 6/75; B62M 6/35; B62M 13/04; B62M 11/12; B62M 11/14; B62M 7/10
See application file for complete search history.

(56) References Cited

U.S. PATENT DOCUMENTS 3,891,044 A * 6/1975 Tiede .................. B62M 6/75
180/222
5,078,227 A * 1/1992 Becker ................. A61G 5/045
180/220

(Continued)

FOREIGN PATENT DOCUMENTS

DE 4219763 A1 12/1993
DE 19633345 A1 2/1998
(Continued)

OTHER PUBLICATIONS

International Search Report and Written Opinion for International Application No. PCT/US2017/048539 dated Nov. 13, 2017, 12 pages.

*Primary Examiner* — Joseph M Rocca
*Assistant Examiner* — Michael R Stabley
(74) *Attorney, Agent, or Firm* — RMCK Law Group, PLC

(57) ABSTRACT

A propulsion device for a bicycle can include a mounting assembly for releasably coupling the propulsion device to the bicycle, a motor, a power source selectively providing power to the motor, a gear assembly, and two frictional drive components coupled to the gear assembly. The two frictional drive components can be movable between an engaged configuration and a disengaged configuration. In the engaged configuration, the two frictional drive components are frictionally engaged with a side of a wheel of the bicycle such that the wheel is arranged between the two frictional drive components. In the disengaged configuration the two frictional drive components are disengaged from the wheel. The motor can drive the gear assembly: (i) to move the two frictional drive components into the engaged configuration, and (ii) to rotate at least one of the two frictional drive components to rotate the wheel of the bicycle.

19 Claims, 9 Drawing Sheets

(51) Int. Cl.
*B62M 11/12* (2006.01)
*B62M 11/14* (2006.01)
*B62M 13/04* (2006.01)
*B62M 6/35* (2010.01)
*B62M 6/40* (2010.01)

(52) U.S. Cl.
CPC ............ *B62M 11/12* (2013.01); *B62M 11/14* (2013.01); *B62M 13/04* (2013.01)

(56) References Cited

U.S. PATENT DOCUMENTS

| | | | |
|---|---|---|---|
| 5,735,363 A | 4/1998 | Horovitz et al. | |
| 6,102,148 A | 8/2000 | Chien | |
| 9,242,698 B2* | 1/2016 | Frieden | B62M 7/12 180/220 |
| 2016/0257374 A1 | 9/2016 | Guida | |
| 2016/0288873 A1* | 10/2016 | Chen | B62M 6/75 180/220 |
| 2016/0347408 A1 | 12/2016 | Guida | |
| 2017/0037884 A1 | 2/2017 | Guida | |

FOREIGN PATENT DOCUMENTS

| | | | |
|---|---|---|---|
| GB | 2489450 A | 10/2012 | |
| WO | 2012000668 A1 | 1/2012 | |

* cited by examiner

PROPULSION DEVICE FOR A BICYCLE

CROSS-REFERENCE TO RELATED APPLICATIONS

This application claims the benefit of U.S. Provisional Application No. 62/379,316, filed on Aug. 25, 2016. The disclosure of the above application is incorporated herein by reference in its entirety.

FIELD

The present disclosure is directed to a propulsion device for a bicycle, and more particularly to a low cost propulsion device for a bicycle that is easily adaptable to various sizes and/or configurations.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Self-propelled cycles (hereinafter such cycles will be referred to as "bicycle(s)" irrespective of the number of wheels) are well known in the art. Such self-propelled bicycles have various configurations. In some configurations, such as in a typical motorcycle, an engine/motor is operably connected (e.g., via a chain) to a gear on the hub of a wheel to propel the wheel. In other configurations, a friction drive system is utilized in which a motor/engine is frictionally engaged with a tire of the bicycle. All such known self-propelled bicycles suffer from various drawbacks and limitations, as further discussed below.

SUMMARY

According to some aspects of the present disclosure, a propulsion device for a bicycle is disclosed. The propulsion device can include a mounting assembly for releasably coupling the propulsion device to the bicycle, a motor, a power source operably coupled to and selectively providing power to the motor, a gear assembly coupled to the motor, and two frictional drive components coupled to the gear assembly. The two frictional drive components can be movable between an engaged configuration and a disengaged configuration. In the engaged configuration, the two frictional drive components are frictionally engaged with a side of a wheel of the bicycle such that the wheel is arranged between the two frictional drive components. In the disengaged configuration the two frictional drive components are disengaged from the wheel. When the power source provides power to the motor, the motor can drive the gear assembly: (i) to move the two frictional drive components into the engaged configuration, and (ii) to rotate at least one of the two frictional drive components such that rotation of the at least one frictional drive component rotates the wheel of the bicycle.

In some aspects, the gear assembly can include a gear housing, a planetary gear assembly coupled to the gear housing and including a ring gear, a sun gear, and a plurality of planet gears, and one or more drive gears coupled to the planetary gear assembly through the sun gear.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

The present disclosure is directed to a propulsion device for propelling at least one wheel of a bicycle, e.g., with an electric motor or engine. In general, the propulsion device includes the following elements: at least one motor or engine (for the sake of simplicity, the term "motor" as used herein will be used to refer to an electric or other type of motor as well as an engine, e.g., an internal combustion or other type of engine), a battery or other source of stored energy for powering the motor, a gear assembly operably coupled to the motor, and one or more friction drive components driven by the gear assembly. When the motor is powered, the friction drive component(s) engage a bicycle wheel on the two opposing sidewalls, e.g, of its corresponding tire, rim, or combination thereof. The motor rotates the friction drive component(s), which engage and rotate the wheel of the bike. The device also has a mounting assembly for fixedly securing the device to a support structure (e.g., a fork) of the bicycle. The mounting assembly can be adjustably secured to the support structure of the bicycle to ensure proper positioning of the friction drive components with respect to the wheel. While the example implementations of the present disclosure are illustrated and described as being attached to and engaged with the front wheel of the bicycle, it should be appreciated that the teachings of the present disclosure are equally applicable, mutatis mutandis, to the rear or other wheel(s) of the bicycle In some aspects, the present disclosure is directed to an aftermarket propulsion device for attaching to a traditional bicycle in order to convert the bicycle into a self-propelled vehicle. Self-propelled bicycles, such as scooters, motorcycles, motor-powered tricycles, electric-bikes, and the like (referred to herein collectively as "motorcycle(s)") are well known. As mentioned above, typically, a motorcycle has an engine or motor that drives the gear train to propel a wheel of the motorcycle. Because the gear train of a bicycle tends to be highly specialized for each bicycle, the engine/motor must also be highly specialized and/or configured to mechanically interact with the gear train of each bicycle to which it will be attached. Such configuration is typically beyond the normal capabilities of the average bicycle user. Additionally, because of the specialization required, there may not be a "one size fits all" or even a "one size fits most" engine/motor design, which may require a potential manufacturer to design and manufacture many different engine/motor assemblies in order to reach even a small percentage of bicycles in use. Due to these (and other) limitations, there remains a need for a bicycle propulsion device that can be easily adapted to many different bicycle designs and that can convert a standard bicycle into a self-propelled bicycle.

Figure 1:
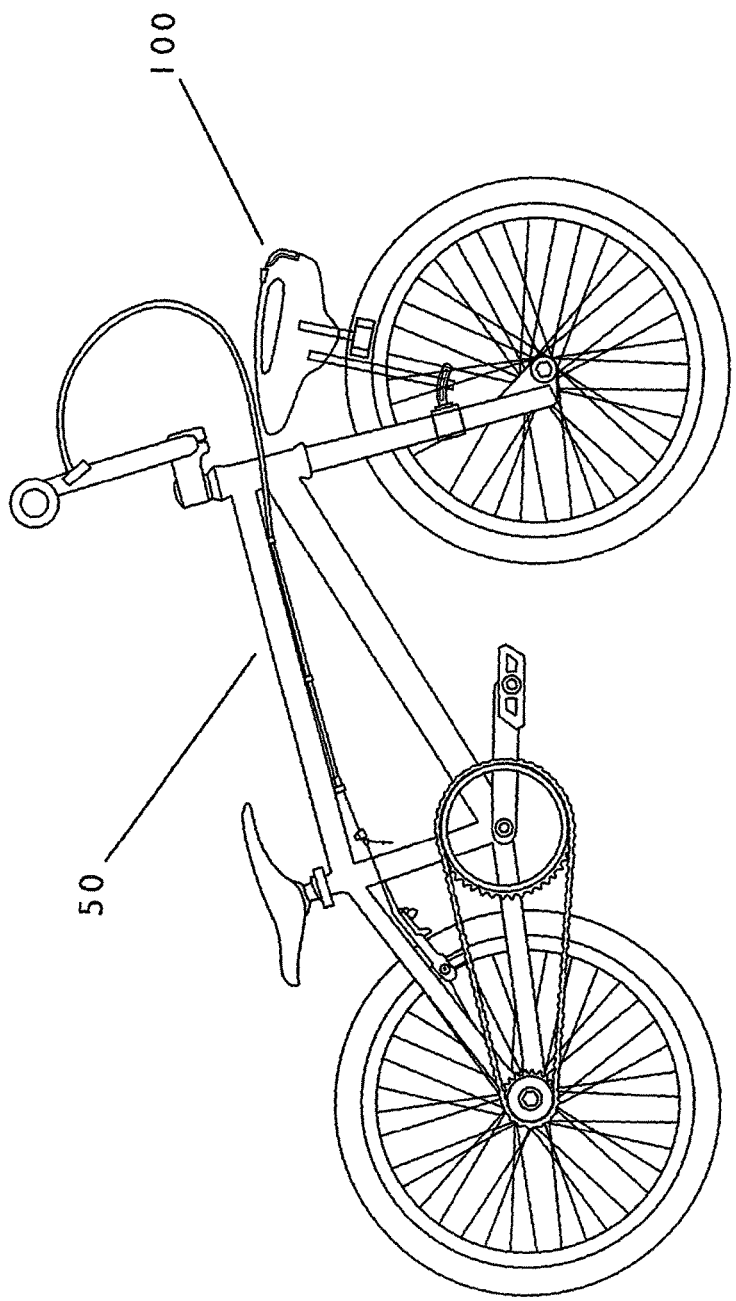
FIG. 1 is a side view of an example bicycle and a propulsion device according to some implementations of the present disclosure.
Figure 2:
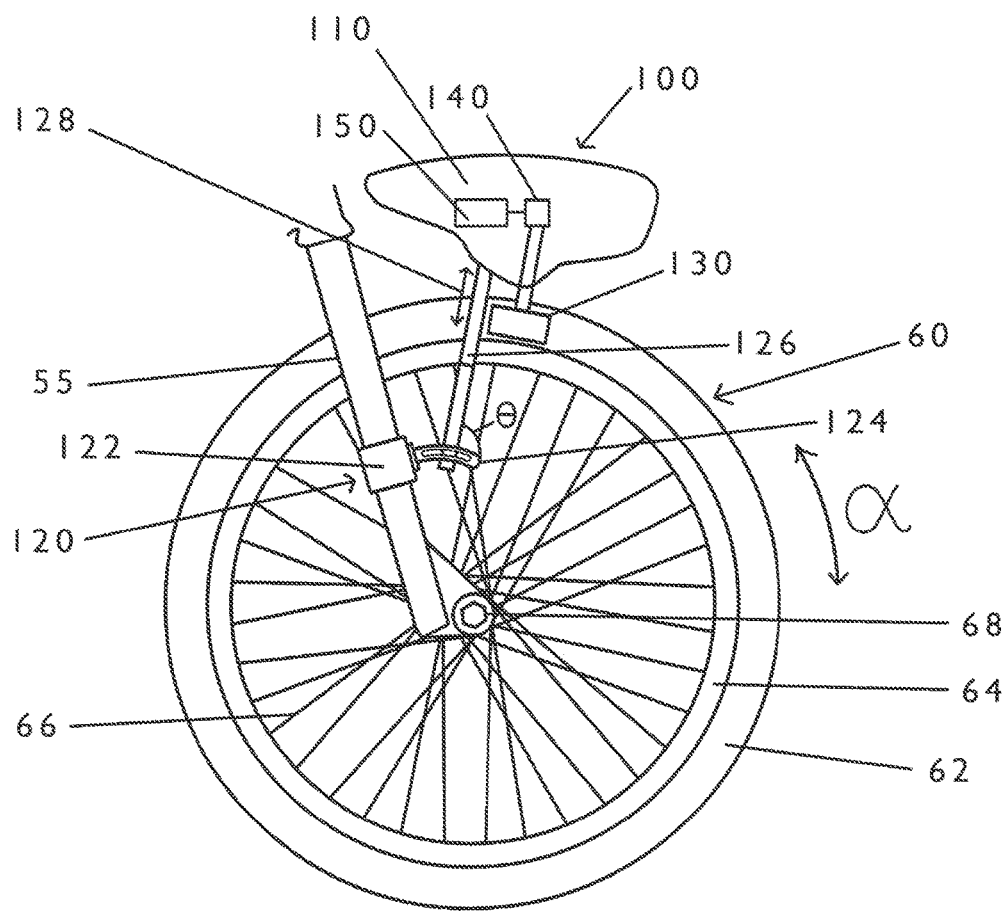
FIG. 2 is a partial side view of the example bicycle and propulsion device of FIG. 1.

With reference to FIGS. 1 and 2, a bicycle 50 with an example propulsion device 100 secured thereto is illustrated. The propulsion device 100 can include a housing 110 that is fixedly secured to a bicycle support structure 55 via a mounting assembly 120. In the illustrated example, the bicycle support structure 55 is the fork of the bicycle. The propulsion device 100 can also include at least one frictional drive component 130 operably coupled to at least one motor 140 that is powered by a power source 150. The frictional drive component 130 is configured to be brought into and released from engagement with the bicycle wheel 60. The bicycle wheel 30 can include a tire 62 that is coupled to a rim 64, which is connected via spokes 66 to a hub 68 that is secured to the bicycle fork 55. In some implementations, the frictional drive component 130 is configured to engage with a side of the wheel 60, e.g., the tire 62, the rim 64, or a combination thereof. During operation, as described more fully below, the frictional drive component 130 is rotated by the motor 140 and frictionally engages the wheel 60 to impart rotation thereto. In this manner, the wheel 60 can be rotated (about its hub 68) and the bicycle 50 can be propelled via the motor 140.

The mounting assembly 120 as illustrated in FIGS. 1 and 2 includes an attachment portion 122, an angle adjustment portion 124, and a height adjustment portion 126. The attachment portion 122 is configured to be fixedly secured to the bicycle support structure (e.g., fork) 55 in order to provide support for the housing 110 and its components. The angle adjustment portion 124 is fixedly secured to the attachment portion 122. In some implementations, the adjustment portion 124 has a curved (e.g., semi-circular) shape. The adjustment portion 124 is adjustably coupled with the height adjustment portion 126 such that the angle θ between the height adjustment portion 126 (and, ultimately, between the housing 110) and the perpendicular (e.g., the ground) plane can be adjusted. For example, the position of the housing 110 and its associated components can be adjusted along an arc α. Furthermore, the height adjustment portion 126 can be adjusted in a direction 128 to adjust the position of the housing 110 and its associated components in the vertical direction (in relation to the perpendicular, e.g., the ground, plane). For example, the height adjustment portion 126 can comprise a telescoping pole or the like that extends/retracts to adjust its "height." In this manner, the housing 110 and its associated components can be fully adjustable in at least two dimensions. Other configurations of the mounting assembly 120 are contemplated and within the scope of the present disclosure.

Figure 3:
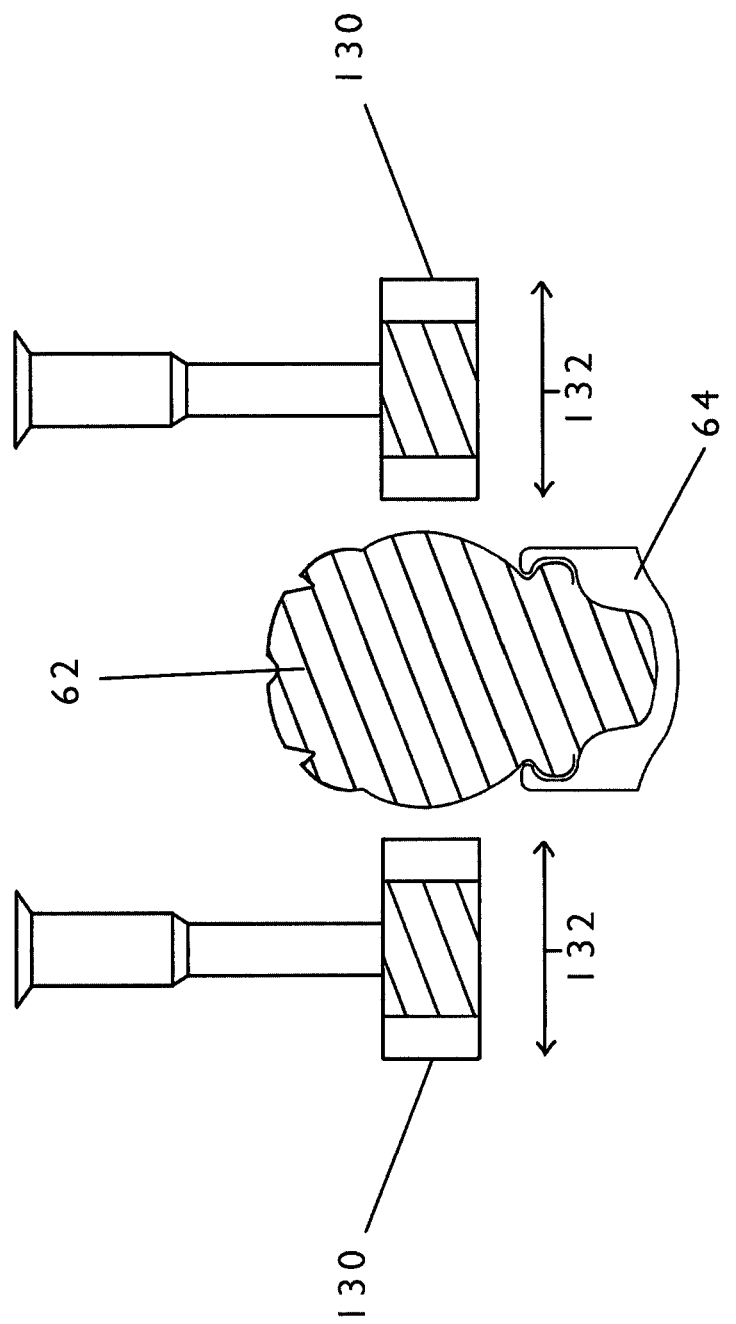
FIG. 3 is a sectional view of a portion of an example bicycle and propulsion device according to some implementations of the present disclosure.

With reference to FIG. 3, a partial sectional view of an example frictional drive component 130 and wheel 60 is illustrated. In addition to the housing 110 and associated components being adjustable in the two dimensions described above, the present disclosure contemplates that the frictional drive component 130 can be further adjustable in a direction 132 to switch between an engaged configuration (in which the frictional drive component 130 is engaged with the wheel 60) and a disengaged configuration (in which the frictional drive component 130 is disengaged from the wheel 60). The frictional drive component 130 is shown in FIG. 3 in the disengaged configuration in which the frictional drive component 130 is not contacting the wheel 60. The disengaged configuration permits a "freewheel" operation in which the wheel 60 of the bicycle 50 can freely rotate without interference of the frictional drive component 130.

The switching of the frictional drive component 130 from the disengaged configuration to the engaged configuration, and vice versa, can be performed in various ways, as described more fully below. For example only, the propulsion device 100 can include a mechanical or electro/mechanical apparatus to physically move the frictional drive component 130 between the engaged and disengaged configurations. In some implementations, for example, where there are individual motors (such as motor 140) directly coupled to each of the frictional drive components 130, the propulsion device 100 can include a mechanical or electro/mechanical apparatus that is separate from the drive motor 140 to physically move the frictional drive component 130 between the engaged and disengaged configurations. In alternative implementations, and as more fully discussed below in reference to FIGS. 4-8, the propulsion device 100 can include a gear assembly that operably couples to the motor 140 to both: (i) move the frictional drive component 130 between the engaged and disengaged configurations, and (ii) impart rotation to the frictional drive component 130.

Figure 4:
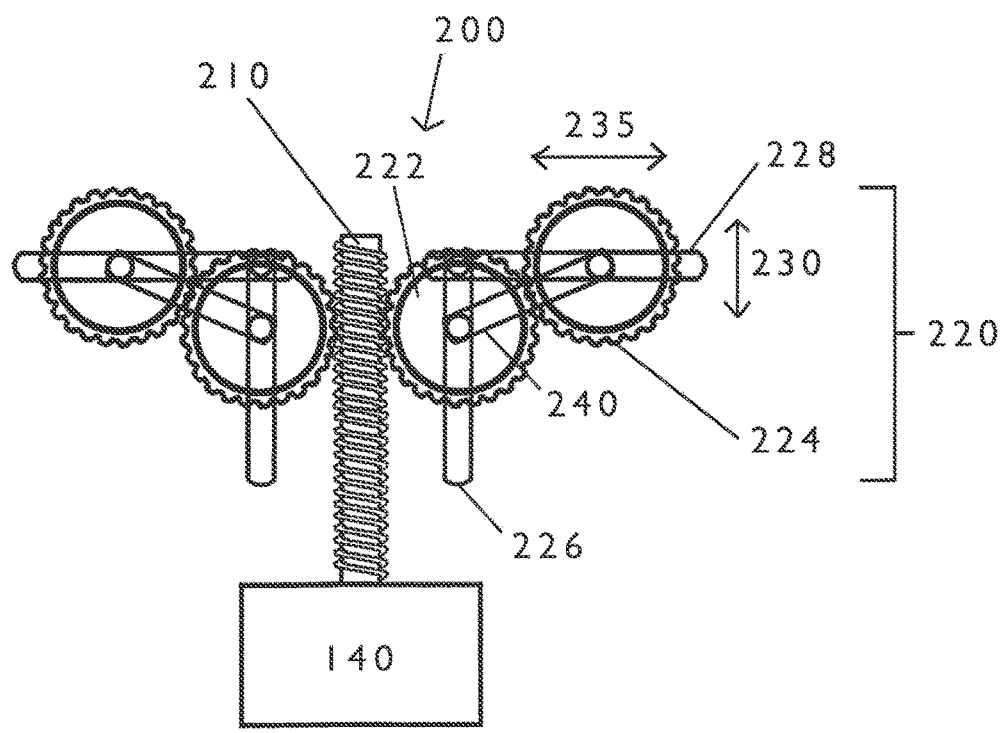
FIG. 4 is a partial schematic diagram of an example gear assembly for a propulsion device according to some implementations of the present disclosure.

Referring now to FIG. 4, an example gear assembly 200 for operably coupling the motor 140 to both: (i) move the frictional drive component 130 between the engaged and disengaged configurations, and (ii) impart rotation to the frictional drive component 130 according to some implementations of the present disclosure is illustrated. The gear assembly 200 includes a worm gear 210 that is coupled with a gear arrangement 220. The worm gear 210 can, e.g., be directly driven (rotated) by the motor 140. For each frictional drive component 130, the gear arrangement 220 can include a first gear 222 that is driven by the worm gear, and a second gear 224 that is driven by the first gear 222 and coupled to the frictional drive component 130. Rotation of the second gear 224 can, either directly or indirectly, provide rotation of the frictional drive component 130, and, therefore, the wheel 60.

The gear arrangement 220 can be configured to permit movement of the first and second gears 222, 224 to switch the frictional drive component 130 between the engaged and disengaged configurations. For example only, the gear arrangement 220 can include a first gear channel 226 in which the first gear 222 (for example, via a center post or the like) can travel, and a second gear channel 228 in which the second gear 224 can travel. The first and second gear channels 226, 228 can permit movement of each of the first and second gears 222, 224, respectively, in a specific direction 230, 235, respectively. Additionally, the first and second gears 222, 224 can be coupled to each other via a linkage assembly 240. In this manner, when the worm gear 210 is rotated by the motor 140, the first gear 222 will initially travel in the direction 230 (in the upward direction as illustrated in FIG. 4). The linkage assembly 240 can impart the movement of the first gear 222 to the second gear 224 to travel in the direction 235 (towards the worm gear 210 as illustrated in FIG. 4). The second gear 224 will correspondingly move the frictional drive component 130 towards the sidewall of the wheel 60 and into the engaged configuration. Once in the engaged configuration, rotation of the first gear 222 will rotate the second gear 224, which will rotate the frictional drive component 130, which will rotate wheel 60.

It should be appreciated that the gear arrangement 220 can be biased (via a spring or other resilient apparatus) to be in the disengaged configuration and the specific implementation details for sufficiently engaging the frictional drive component 130 with the wheel 60 can be determined by one skilled in the art. Additionally, in some implementations the gear arrangement 220 can include an additional spring, centrifugal clutch, or other type of biasing element (not shown) to bias the gear assembly 200 such that, in the disengaged configuration, the force provided by the motor 140 is prioritized to move the frictional drive component 130 into the engaged configuration over rotating the frictional drive component 130. Such biasing of the gear assembly 200 can result, e.g., in the gear assembly 200 first moving the frictional drive component 130 into the engaged configuration before rotating the frictional drive component 130, or the gear assembly 200 automatically increasing the provision of the force to rotate the frictional drive component 130 once in the engaged configuration.

Figure 5:
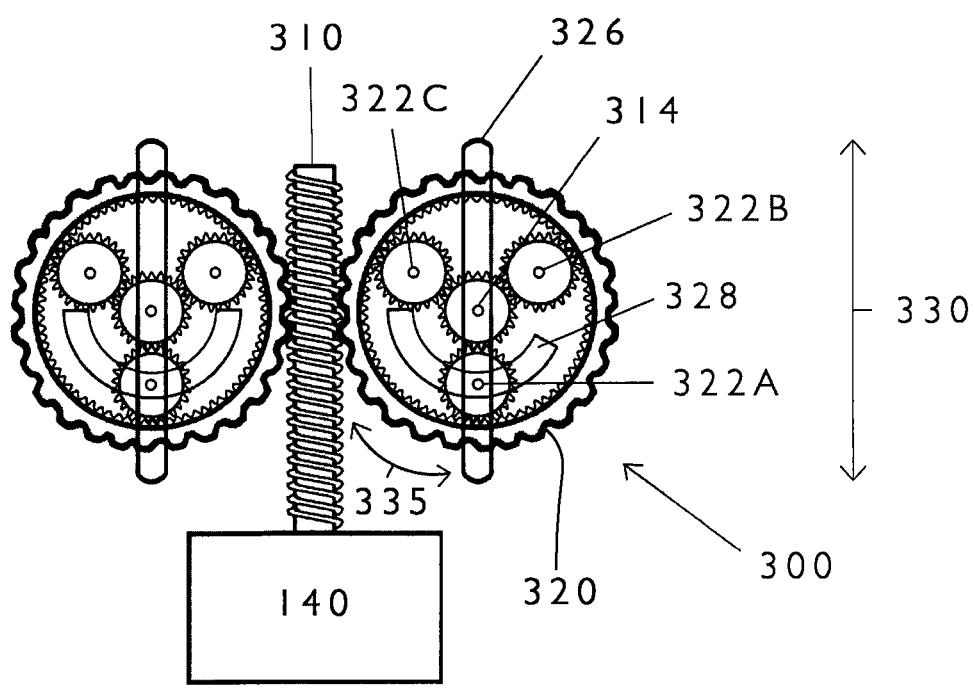
FIG. 5 is a partial schematic diagram of another example gear assembly for a propulsion device according to some implementations of the present disclosure.

Referring now to FIG. 5, an example planetary gear assembly 300 for operably coupling the motor 140 to both: (i) move the frictional drive component 130 between the engaged and disengaged configurations, and (ii) impart rotation to the frictional drive component 130 according to some implementations of the present disclosure is illustrated. The planetary gear assembly 300 can include a worm gear 310 that is coupled with a ring gear 320 for each frictional drive component 130. The worm gear 310 can, e.g., be directly driven (rotated) by the motor 140. The ring gear 320 can also couple with a plurality of planet gears 322A, 322B, 322C (referred to herein individually and collectively as "planet gear(s) 322"), which interact with a sun gear 314. The ring gear 320 can be driven by the worm gear 310 and can drive the planet gears 322. One of the planet gears 322 (in FIG. 5, planet gear 322A) can be coupled to the frictional drive component 130 such that rotation of the planet gear 322A can, either directly or indirectly, provide rotation of the frictional drive component 130, and, therefore, the wheel 60.

The planetary gear assembly 300 operates similarly to the gear assembly 200 described above. The planetary gear assembly 300 can be configured to permit movement of the ring gear 320 and planet gears 322 to switch the frictional drive component 130 between the engaged and disengaged configurations. For example only, the planetary gear assembly 300 can include a first gear channel 326 in which the ring gear 322 (for example, via a center post, the sun gear 314, or the like) can travel, and a second gear channel 328 in which the planet gear 322 can travel. The first and second gear channels 326, 328 can permit movement of the ring gear 320 and the planet gear 322, respectively, in a specific direction 330, 335, respectively.

When the worm gear 310 is rotated by the motor 140, the ring gear 320 will initially travel in the direction 330 (in the upward direction as illustrated in FIG. 5), and the planet gear 322A will move in the direction 335 (towards the worm gear 310 as illustrated in FIG. 5). The planet gear 322A will correspondingly move the frictional drive component 130 towards the sidewall of the tire 62 and into the engaged configuration. Once in the engaged configuration, rotation of the ring gear 320 will rotate the planet gear 322A, which will rotate the frictional drive component 130, which will rotate wheel 60.

It should be appreciated that the ring gear 320 can be biased (via a spring or other resilient apparatus) such that the frictional drive component 130 is in the disengaged configuration and the specific implementation details for sufficiently engaging the frictional drive component 130 with the tire 62 can be determined by one skilled in the art. Additionally, as described above, in some implementations the gear assembly 300 (such as ring gear 320) can include an additional spring, centrifugal clutch, or other type of biasing element (not shown) to bias the gear assembly 300 such that, in the disengaged configuration, the force provided by the motor 140 is prioritized to move the frictional drive component 130 into the engaged configuration over rotating the frictional drive component 130. Such biasing of the gear assembly 300 can result, e.g., in the gear assembly 300 first moving the frictional drive component 130 into the engaged configuration before rotating the frictional drive component 130, or the gear assembly 300 automatically increasing the provision of the force to rotate the frictional drive component 130 once in the engaged configuration.

In some implementations, the propulsion device 100 can further incorporate a freewheel mechanism, e.g., that is incorporated into the frictional drive component 130 and/or the gear assembly 200/planetary gear assembly 300. The freewheel mechanism permits the wheel 60 of the bicycle 50, even in the engaged configuration, to rotate faster than the motor 140 would drive the wheel 60. In this manner, the wheel 60 can turn without being slowed down by (or rotating) the motor 140. The freewheel mechanism is configured to only permit a one-way energy transfer from the motor 140 to the wheel 60, and not vice versa, when the frictional drive component 130 is in the engaged configuration.

Figure 6:
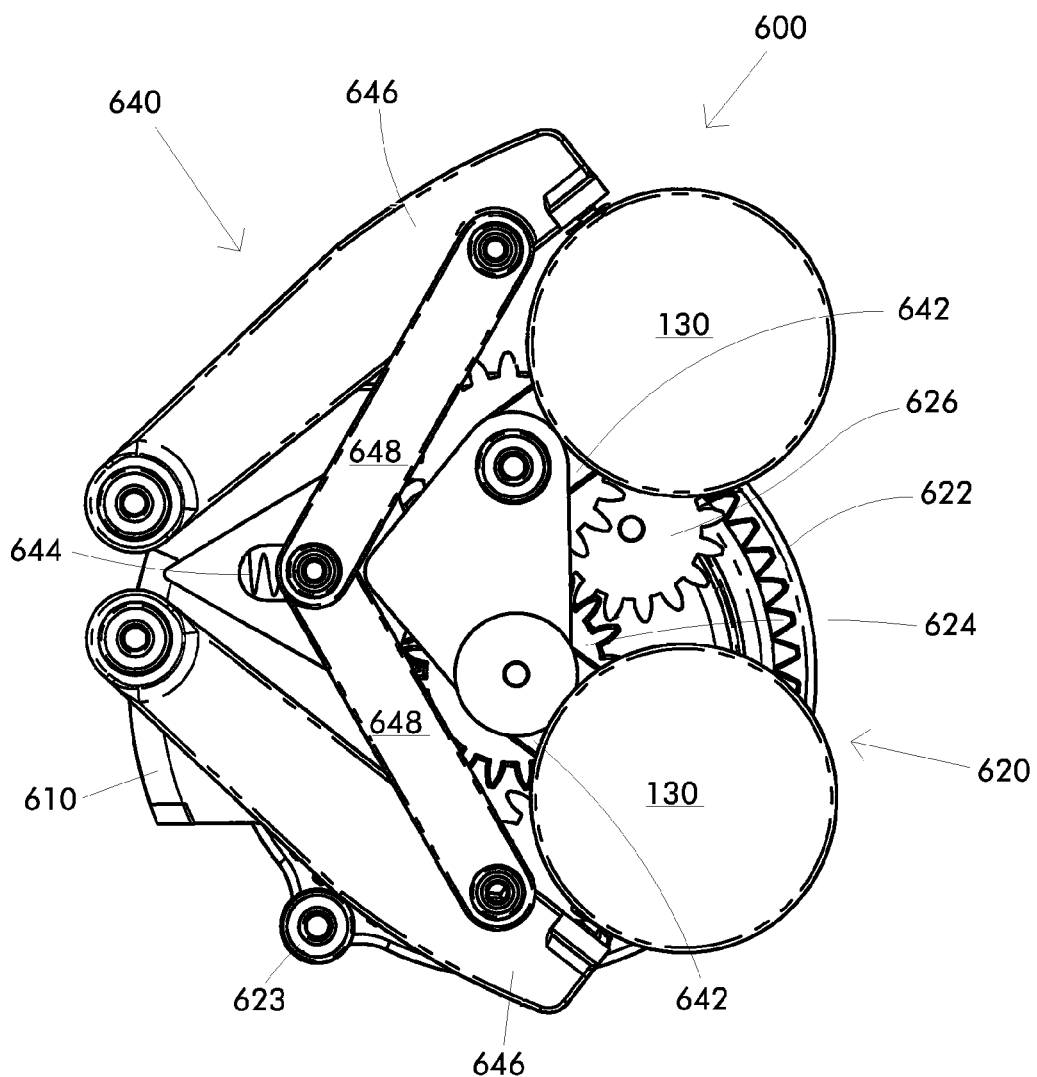
FIG. 6 is a first view of another example gear assembly for a propulsion device according to some implementations of the present disclosure.
Figure 7:
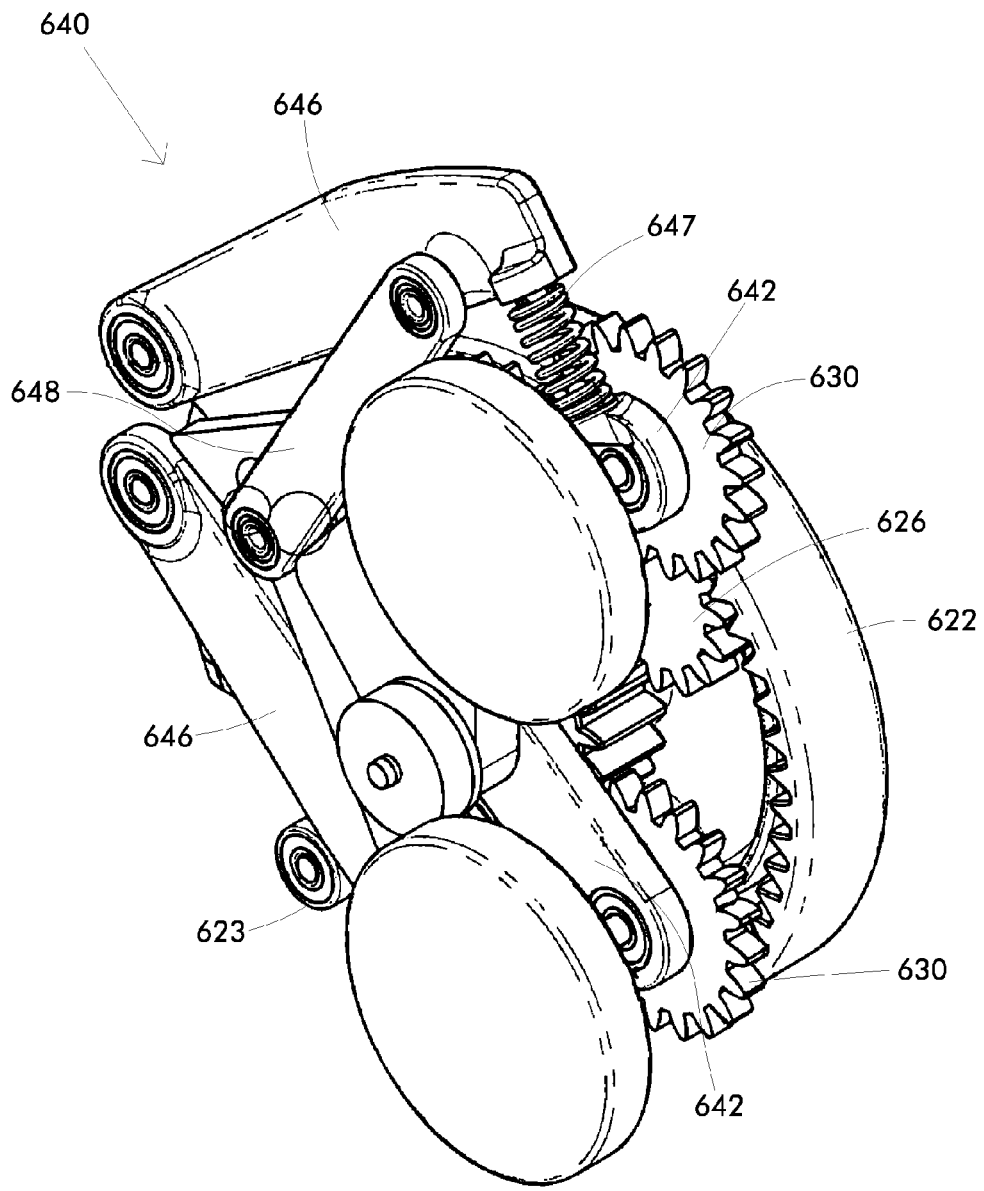
FIG. 7 is a perspective view of the example gear assembly of FIG. 6.
Figure 8:
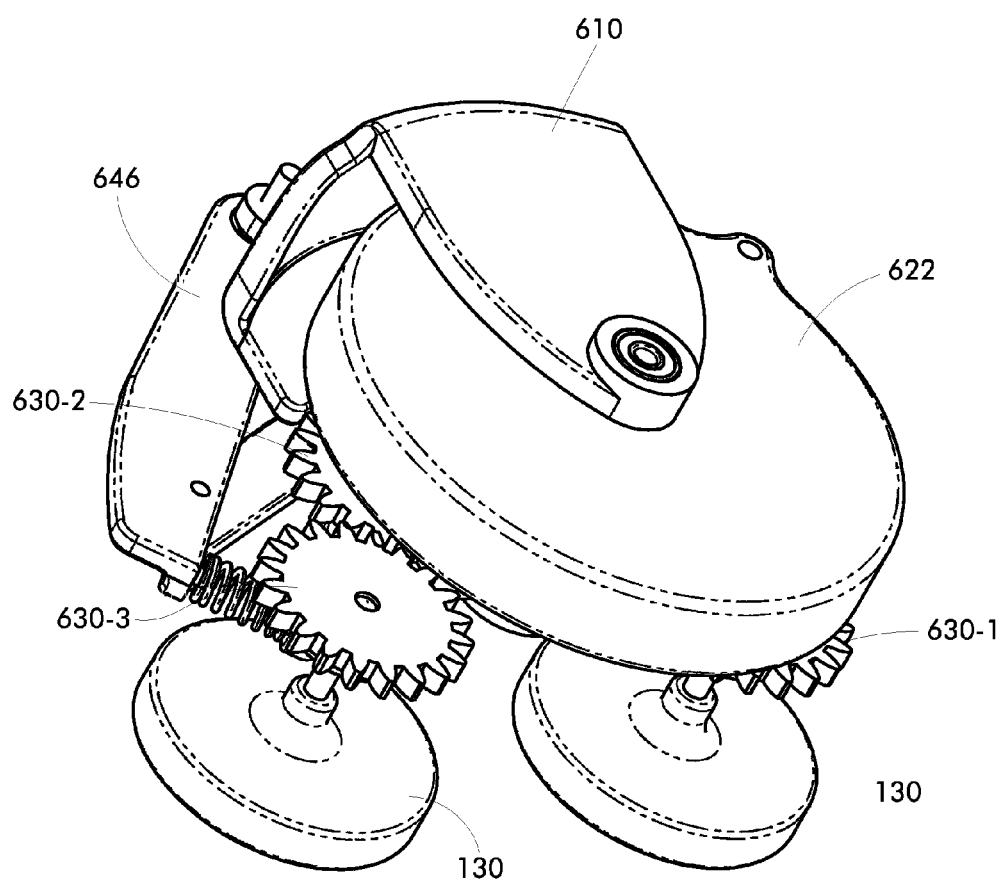
FIG. 8 is another perspective view of the example gear assembly of FIG. 6.

Referring now to FIGS. 6-8, an example gear assembly 600 for the propulsion device 100 according to some implementations of the present disclosure is illustrated. As discussed above, the propulsion device 100 can also include a mounting assembly 120 for releasably coupling the propulsion device 100 to the bicycle 50, a motor 140, a power source 150 operably coupled to and selectively providing power to the motor 140, and two frictional drive components 130. The two frictional drive components 130 can be movable between an engaged configuration and a disengaged configuration.

In the engaged configuration, the two frictional drive components 130 are frictionally engaged with a side of a wheel 60 of the bicycle 50 such that the wheel 60 is arranged between the two frictional drive components 130. In the disengaged configuration (see, e.g., FIG. 3), the two frictional drive components 130 are disengaged from the wheel 130. When the power source 150 provides power to the motor 140, the motor 140 drives the gear assembly 600 to both move the two frictional drive components 130 into the engaged configuration, and also rotate at least one of the two frictional drive components 130 such that rotation of the at least one frictional drive component 130 rotates the wheel 60 of the bicycle 50, as described more fully below. In this manner, a single motor 140 can both: (i) move the frictional drive components 130 between the engaged and disengaged configurations, and (ii) impart rotation to the frictional drive component(s) 130 and, thereby, the wheel 60.

The gear assembly 600 can include a gear housing 610 which is coupled to the other components of the gear assembly 600. The gear housing 610 can be fixedly secured to the mounting assembly 120, e.g., via the propulsion device housing 110, to provide a stable platform for the gear assembly 600. The gear assembly 600 can further include a planetary gear assembly 620 coupled to the gear housing 610, and one or more drive gears 630 coupled to the planetary gear assembly 620. The planetary gear assembly 620 includes a ring gear 622, a sun gear 624, and a plurality of planet gears 626. The one or more drive gears 630 can be coupled to at least one of the two frictional drive components 130, as described herein. In the illustrated embodiment, the one or more drive gears 630 are coupled to the planetary gear assembly 620 through the sun gear 624, although other arrangements are within the scope of the present disclosure.

The example gear assembly 600 can further include a lever assembly 640 operably coupled to the frictional drive components 130. The lever assembly 640 can be configured to assist in moving the frictional drive components 130 between the engaged and disengaged configurations. In the illustrated example, the lever assembly 640 includes a movable engagement lever 642 coupled to each of the frictional drive components 130. The lever assembly 640 can further include a biasing element 644 operably coupled to the movable engagement levers 642 to bias the frictional drive components 130 to be in the disengaged configuration.

In some aspects the lever assembly 640 can additionally include a pinch lever 646 for each of the movable engagement levers 642, a resilient element 647 coupling each of the pinch levers 646 with its corresponding movable engagement levers 642, and a linkage assembly 648 coupling the pinch levers 646 together. The linkage assembly 648 can operate such that movement of one of the pinch levers 646 causes the linkage assembly 648 to impart movement to the other one of the pinch levers 646. In this manner, the pinch levers 646 can move in conjunction to cause the frictional drive components 130 to frictionally engage the side of the wheel 60 in the engaged configuration such that the wheel 60 is arranged between, or "pinched" by, the two frictional drive components 130. Similarly, the pinch levers 646 can further move in conjunction to cause the frictional drive components 130 to disengage from the wheel 60 in the disengaged configuration. As shown in FIG. 6, in some implementations the biasing element 644 can be coupled to the linkage assembly 648. In this manner, the number of biasing elements 644 may be reduced to one, although the use of a plurality of biasing elements 644 is within the scope of the present disclosure.

The resilient element 647 may provide a number of advantageous features to the lever assembly 640. For example only, the resilient element 647 can provide an individualized shock absorbing functionality for each of the frictional drive components 130. In this manner, a bump or other form of unintentional force (e.g., due to a road condition or a wheel 60 that is not true) applied to one of the frictional drive components 130 can be at least partially absorbed by the resilient element 647 such that the force is not fully transferred to the other frictional drive component 130, e.g., through the pinch levers 646/linkage assembly 648.

The resilient element 647 may also assist with the frictional engagement between the frictional drive components 130 and the wheel 60. As an example, in the engaged configuration the frictional drive components 130 will move towards each other to "pinch" the wheel 60. Depending on the thickness of the wheel 60, the resilient element 647 can be configured to absorb some of the "pinching" force in a compressed condition, e.g., for a thicker wheel 60, or provide a secure frictional engagement with the wheel 60 in an extended condition. Thus, the resilient element 647 may also provide the advantage of permitting the propulsion device 100 to operate on a wider range of wheel sizes/thicknesses.

The motor 140 can be coupled to one or more of the planet gears 626 such that, when powered by a power source 150, the planet gears 626 can impart rotational force to both the ring gear 622 and the sun gear 624. The ring gear 622 can be operably coupled to the lever assembly 640 such that rotation of the ring gear 622 causes the lever assembly 640 to move the two frictional drive components 130 into the engaged configuration. For example only, in some implementations the ring gear 622 can include an engagement projection 623 that operably couples the ring gear 622 to the lever assembly 640. In the illustrated example, the engagement projection 623 comprises a bearing, e.g., to provide a lower friction coupling between the ring gear 622 and the lever assembly 640, that engages with at least one of the pinch levers 646. As described above, in some implementations the gear assembly 600 can include an additional spring, centrifugal clutch, or other type of biasing element (not shown) to bias the gear assembly 600 such that, in the disengaged configuration, the force provided by the motor 140 is prioritized to move the frictional drive component 130 into the engaged configuration over rotating the frictional drive component 130. Such biasing of the gear assembly 600 can result, e.g., in the gear assembly 600 first moving the frictional drive component 130 into the engaged configuration before rotating the frictional drive component 130, or the gear assembly 600 automatically increasing the provision of the force to rotate the frictional drive component 130 once in the engaged configuration.

When the power source 150 provides power to the motor 140, the motor 140 drives the planet gears 626 to rotate, which causes the ring gear 622 and sun gear 624 to rotate. As the ring gear 622 rotates, the engagement projection 623 will move against the lever assembly 640, e.g., one of the pinch levers 646 as shown, to move a frictional drive component 130 inwardly. The linkage assembly 648 will then operate to transmit the movement from the engagement projection 623 to the other pinch lever 646 such that the gear assembly 640 is frictionally engaged with the wheel 60. In this manner, both of the frictional drive components 130 can frictionally engage the wheel 60 with approximately the same amount of force. This type of engagement may provide advantages for the propulsion device 100, including but not limited to providing an equal friction to both sides of the wheel 60, which may reduce tire wear.

In the illustrated implementation, the one or more drive gears 630 comprise three drive gears: a first drive gear 630-1, a second drive gear 630-2, and a third drive gear 630-3 (FIG. 8). The first and second drive gears 630-1, 630-2 can directly engage with the sun gear 624 to rotate therewith. The first and third drive gears 630-1, 630-3 can each directly engage with one of the frictional drive components 130 and rotate therewith. Additionally, the second drive gear 630-2 can directly engage with the third drive gear 630-3. In this manner, rotation of the sun gear 624 can rotate the first and second drive gears 630-1, 630-2, which then rotates the third drive gear 630-3 and one of the frictional drive components 130. The third drive gear 630-3 can then rotate the other one of frictional drive components 130. Other configurations are within the scope of this disclosure.

Figure 9:
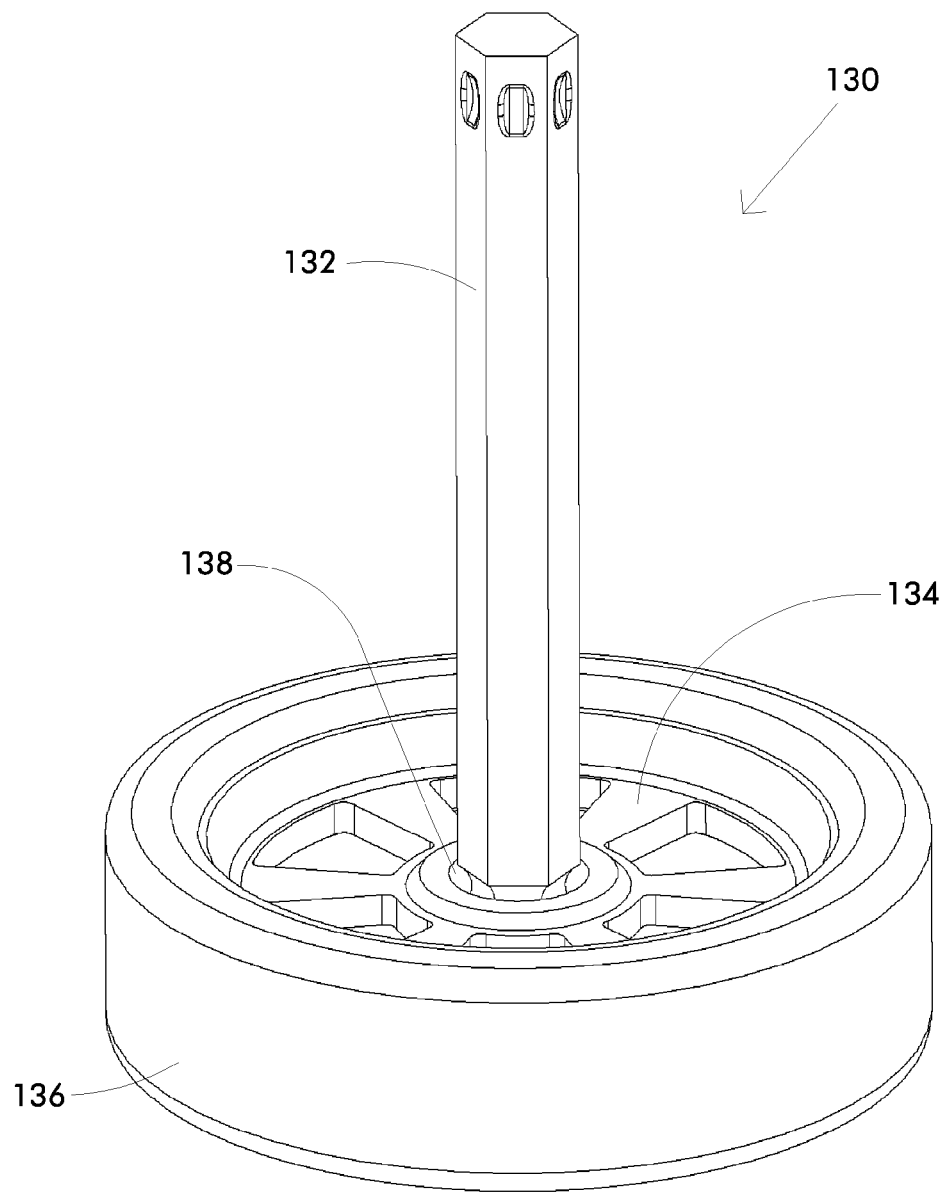
FIG. 9 is perspective view of an example frictional drive component of the example gear assembly of FIG. 6.

With additional reference to FIG. 9, an example frictional drive component 130 according to some implementations of the present disclosure is illustrated. The frictional drive component 130 can include a shaft 132 (e.g., for coupling to the gear assembly 200, 300, 600), a hub 134 coupled to the shaft 132, and an outer frictional material 136 surrounding the hub 134. In the engaged configuration, the outer frictional material 136 surrounding the hub 134 can frictionally engage the wheel 60 of the bicycle 50, as described above. The outer frictional material 136 can comprise any suitable material for frictionally engaging the wheel 60, including but not limited to a rubber material, a plastic material, a urethane or other elastomer, a metal with a ribbed or otherwise rough surface, and a composite material with an abrasive surface.

In some aspects, the appropriate outer frictional material 136 can be selected based on the surface of the wheel 60 with which the outer frictional material 136 will engage. For example only, if the frictional drive component 130 is configured to engage the surface of a tire 62 (typically made of rubber or similar material), the outer frictional material 136 can be selected to properly frictionally engage with the tire 62. Similarly, if the frictional drive component 130 is configured to engage the surface of a rim 64 of the wheel 60, the outer frictional material 136 can be selected to properly frictionally engage with the rim 64.

One potential advantage of the described construction of the frictional drive component 130 is that, as the components of the propulsion device 100/bicycle 50 may wear as they are used, the outer frictional material 136 of the present construction may be formed such that this component wears before other more expensive components. In this manner, the outer frictional material 136 may be replaced without replacing the shaft 132 and hub 134. Other configurations/constructions of the frictional drive component 130 are within the scope of this disclosure.

Furthermore, in some implementations, the frictional drive component 130 can also include a freewheel mechanism 138 that operates to disengage the frictional drive components 130 from the motor 140 of the propulsion device 100. The freewheel mechanism 138 permits the wheel 60 of the bicycle 50, even in the engaged configuration, to rotate faster than the motor 140 would drive the wheel 60. In this manner, the wheel 60 can turn without being slowed down by (or rotating) the motor 140. The freewheel mechanism 138 is configured to only permit a one-way energy transfer from the motor 140 to the wheel 60, and not vice versa, when the frictional drive component 130 is in the engaged configuration. It should be appreciated that the freewheel mechanism 138 may be incorporated in any component of the propulsion device 100 between the wheel 60 and the motor 140, e.g., the gear assembly 200, the planetary gear assembly 300, or the gear assembly 600.

In the illustrated implementations of the propulsion device 100 according to the present disclosure, two frictional drive components 130 are utilized and driven by one, single motor 140 through the use of the disclosed gear assemblies 200, 300, 600. This arrangement may provide a number of advantages over other known propulsion devices. For example only, the use of one motor 140 (as opposed to two or more motors 140) to provide rotation to the wheel 60 of the bicycle 50 can eliminate the need to use more expensive step motors and/or provide more complex electronics to ensure that the multiple motors are properly synchronized. This may also result in less wear to the frictional drive components 130, wheel 62, and/or tire 62 during operation.

Further, because there are multiple points of frictional engagement, the disclosed propulsion device 100 may be more tolerant of debris (water, dirt, grease, etc.) that may reduce the frictional engagement of the frictional drive components 130 and the wheel 60. It should be appreciated, however, that the present disclosure may utilize only one frictional drive component 130 that is coupled to and rotated by the motor 140. In such implementations, a bearing or idler that freely rotates can replace one of the frictional drive components 130 and be utilized to ensure the proper arrangement and mating of the wheel 60 with the other frictional drive component 130.

An additional potential advantage of the propulsion device 100 of the present disclosure is that the frictional engagement with the side of the wheel 60 may permit a less robust and expensive mounting assembly 120 to be utilized. By arranging the wheel 60 between the frictional drive components 130 (e.g, such that the wheel is "pinched" between the frictional drive components 130), the mounting assembly 120 can be less complex and/or strong in comparison to propulsion devices in which the tire is engaged on the top surface. In such devices, a strong force must be provided to ensure that the propulsion device is properly engaged with the wheel. Accordingly, the propulsion device 100 according to the present disclosure may utilize a mounting assembly 120 that permits quick and easy disengagement from a bicycle 50, e.g., without tools utilizing a quick release connector, as the engagement force is provided by the frictional drive components 130 themselves, rather than through the mounting assembly 120.

Yet another potential advantage of the propulsion device 100 of the present disclosure is that one single motor 140 can be utilized to both: (i) move the two frictional drive component(s) 130 into the engaged configuration to frictionally engage the wheel 60, and (ii) rotate the two frictional drive component(s) 130 such that rotation of the frictional drive component(s) 130 rotates the wheel 60 of the bicycle 50. This may reduce the complexity of and/or cost of manufacturing the propulsion device 100 due to the reduction in components. Furthermore, the use of one motor 140 may also be more tolerant to alignment errors when coupling the propulsion device 100 to a bicycle 50.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known procedures, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The term "and/or" includes any and all combinations of one or more of the associated listed items. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A propulsion device for a bicycle, comprising:
   a mounting assembly for releasably coupling the propulsion device to the bicycle;
   a motor;
   a power source operably coupled to and selectively providing power to the motor;
   a gear assembly coupled to the motor; and
   two frictional drive components coupled to the gear assembly, the two frictional drive components being movable between an engaged configuration and a disengaged configuration, wherein in the engaged configuration the two frictional drive components are frictionally engaged with a side of a wheel of the bicycle such that the wheel is arranged between the two frictional drive components and in the disengaged configuration the two frictional drive components are disengaged from the wheel,
   wherein:
      when the power source provides power to the motor, the motor drives the gear assembly: (i) to move the two frictional drive components into the engaged configuration, and (ii) to rotate at least one of the two frictional drive components such that rotation of the at least one frictional drive component rotates the wheel of the bicycle, and
      the gear assembly comprises:
         a gear housing;
         a planetary gear assembly coupled to the gear housing and including a ring gear, a sun gear, and a plurality of planet gears; and
         one or more drive gears coupled to the at least one of the two frictional drive components, wherein the one or more drive gears are coupled to the planetary gear assembly through the sun gear.

2. The propulsion device of claim 1, wherein the motor comprises a single motor that drives the gear assembly: (i) to move the two frictional drive components into the engaged configuration, and (ii) to rotate at least one of the two frictional drive components such that rotation of the at least one frictional drive component rotates the wheel of the bicycle.

3. The propulsion device of claim 1, wherein the gear assembly further comprises a lever assembly operably coupled to the two frictional drive components, the lever assembly comprising:
   a movable engagement lever coupled to each of the two frictional drive components; and
   a biasing element operably coupled to the movable engagement levers to bias the two frictional drive components to be in the disengaged configuration.

4. The propulsion device of claim 3, wherein the lever assembly further comprises:
   a pinch lever for each of the movable engagement levers;
   a resilient element coupling each of the pinch levers with its corresponding movable engagement levers; and
   a linkage assembly coupling the pinch levers together such that movement of one of the pinch levers causes the linkage assembly to impart movement to the other one of the pinch levers.

5. The propulsion device of claim 4, wherein the biasing element is coupled to the linkage assembly.

6. The propulsion device of claim 4, wherein the ring gear is operably coupled to the lever assembly such that rotation of the ring gear causes the lever assembly to move the two frictional drive components into the engaged configuration.

7. The propulsion device of claim 6, wherein the ring gear comprises an engagement projection operably coupling the ring gear to the lever assembly.

8. The propulsion device of claim 7, wherein the engagement projection engages with one of the pinch levers.

9. The propulsion device of claim 8, wherein the engagement projection comprises a bearing.

10. The propulsion device of claim 1, wherein the motor provides rotational motion to the plurality of planet gears, which imparts rotational motion to the sun gear and ring gear.

11. The propulsion device of claim 1, wherein the one or more drive gears comprises a first drive gear, a second drive gear, and a third drive gear, wherein:
   the first and second drive gears are directly engaged with the sun gear;
   the first and third drive gears are each directly engaged with one of the two frictional drive components; and
   the second drive gear is directly engaged with the third drive gear.

12. The propulsion device of claim 1, wherein each of the frictional drive components comprises:
   a shaft coupled to the gear assembly;
   a hub coupled to the shaft; and
   an outer frictional material surrounding the hub and frictionally engaging the wheel of the bicycle in the engaged configuration.

13. A propulsion device for a bicycle, comprising:
   a mounting assembly for releasably coupling the propulsion device to the bicycle;
   a single motor;
   a power source operably coupled to and selectively providing power to the motor;
   a gear assembly coupled to the motor, the gear assembly comprising:
      a gear housing, a planetary gear assembly coupled to the gear housing and including a ring gear, a sun gear, and a plurality of planet gears, and one or more drive gears coupled to the planetary gear assembly through the sun gear, and two frictional drive components coupled to the gear assembly, the two frictional drive components being movable between an engaged configuration and a disengaged configuration, wherein in the engaged configuration the two frictional drive components are frictionally engaged with a side of a wheel of the bicycle such that the wheel is arranged between the two frictional drive components and in the disengaged configuration the two frictional drive components are disengaged from the wheel, wherein:

when the power source provides power to the motor, the motor drives the gear assembly: (i) to move the two frictional drive components into the engaged configuration to frictionally engage the wheel, and (ii) to rotate each of the two frictional drive components such that rotation of the frictional drive components rotates the wheel of the bicycle.

14. The propulsion device of claim 13, wherein the motor provides rotational motion to the plurality of planet gears, which imparts rotational motion to the sun gear and ring gear.

15. The propulsion device of claim 14, wherein the one or more drive gears comprises a first drive gear, a second drive gear, and a third drive gear, wherein:

the first and second drive gears are directly engaged with the sun gear;

the first and third drive gears are each directly engaged with one of the two frictional drive components; and the second drive gear is directly engaged with the third drive gear.

16. The propulsion device of claim 13, wherein each of the frictional drive components comprises:

a shaft coupled to the gear assembly;

a hub coupled to the shaft; and an outer frictional material surrounding the hub and frictionally engaging the wheel of the bicycle in the engaged configuration.

17. The propulsion device of claim 13, wherein the gear assembly further comprises a lever assembly operably coupled to the two frictional drive components, the lever assembly comprising:

a movable engagement lever coupled to each of the two frictional drive components; and a biasing element operably coupled to the movable engagement levers to bias the two frictional drive components to be in the disengaged configuration.

18. The propulsion device of claim 17, wherein the lever assembly further comprises:

a pinch lever for each of the movable engagement levers;

a resilient element coupling each of the pinch levers with its corresponding movable engagement levers; and a linkage assembly coupling the pinch levers together such that movement of one of the pinch levers causes the linkage assembly to impart movement to the other one of the pinch levers.

19. The propulsion device of claim 18, wherein the biasing element is coupled to the linkage assembly.

* * * * *